United States Patent [19]

De Bruyn et al.

[11] Patent Number: 5,128,510

[45] Date of Patent: Jul. 7, 1992

[54] SPOT WELDING TONGS

[75] Inventors: Gerard De Bruyn, Antony; Andre Lonchampt, Mariel/Maudre, both of France

[73] Assignee: Sagemu, S.A., Gentilly, France

[21] Appl. No.: 686,651

[22] Filed: Apr. 17, 1991

[30] Foreign Application Priority Data

Feb. 20, 1991 [FR] France .................. 91 02030

[51] Int. Cl.⁵ .................. B23K 11/10; B23K 11/28; B23K 11/31
[52] U.S. Cl. ........................................... 219/89
[58] Field of Search ........................... 219/89, 90

[56] References Cited

U.S. PATENT DOCUMENTS

| | | | |
|---|---|---|---|
| 1,980,228 | 11/1934 | Rogers | 219/90 |
| 4,015,098 | 3/1977 | Matter et al. | 219/90 |
| 4,393,293 | 7/1983 | Inoue et al. | 219/90 |

FOREIGN PATENT DOCUMENTS

| | | | |
|---|---|---|---|
| 3327510 | 2/1985 | Fed. Rep. of Germany | 219/90 |
| 3524342 | 1/1987 | Fed. Rep. of Germany | 219/90 |
| 57-25291 | 2/1982 | Japan | 219/90 |

Primary Examiner—Geoffrey S. Evans
Attorney, Agent, or Firm—Mason, Fenwick & Lawrence

[57] ABSTRACT

An articulated pair of spot welding tongs comprising two supports (1,2) of the male and female type, each having a fork joint and an orifice, and two interchangeable arms (3,5), each carried by one of the supports. Each support is made from aluminum and treated by hard anodizing. A pin (13) traverses the two orifices, and carries two plates (39,40), each plate comprising a metal support plate covered by a coating based on fluorocarbonated fibers. The welding tongs can be used for a long period of time without any need for changing the insulating elements.

12 Claims, 3 Drawing Sheets

SPOT WELDING TONGS

FIELD OF THE INVENTION

The present invention relates to a pair of spot welding tongs.

RELATED ART

Spot welding tongs are already known which are used manually, or incorporated into machines or, now, are often incorporated into robots termed welding robots.

Such tongs are currently used and employed in the automobile industry. They are also called welding guns.

They comprise at least one articulated arm and generally they comprise two arms articulated with respect to each other and each carrying an electrode.

They generally comprise two arms articulated with respect to each other and each carrying an electrode. One articulated arm is usualy called rocher welding arm.

Having two arms they may be called manual guns, mechanical guns, robot guns due to the mechanism used to act them.

The electrodes are connected to a current source, and a control mechanism generates the relative rotation of the arms so as to bring the electrodes closer together and to bring them into contact with the parts to be welded. Either they carry a transformer or they do not.

For such a pair of tongs to operate satisfactorily, the electrodes must be insulated with respect to each other when they are separated. To this end, according to the techniques of the prior art, the relative insulation of the arms is effected in the region of their hinge pin. This insulation requires the use of washers and insulating barrels which, placed between two parts in relative movement, are subjected to mechanical wear. Now materials having a good capacity for electrical insulation generally have a poor mechanical strength and hence become worn relatively quickly.

In the case of spot welding tongs, this wear requires maintenance operations which are particularly restricting under the existing working conditions and which give rise to high maintenance and operating costs.

SUMMARY OF THE INVENTION

The object of the present invention is to provide a pair of spot welding tongs which can be used for a long period of time without there being any need to carry out maintenance operations on them, for example changing insulating elements.

Moreover, hitherto it was necessary to have available a large number of models of welding tongs in order to satisfy the various conditions of use. These conditions of use vary according to the method of actuating the tongs, whether manual, pneumatic, hydraulic or electrical (manual, mechanical, robot guns with or without transformer), according to the length of the arms and according to the size of the torque applied during the welding. These latter parameters are dependent on the type of parts which it is desired to weld.

A second object of the invention is to provide a pair of welding tongs, the structure of which is polyvalent and can be modified as a function of the actuating mode selected and of the type of parts which it is desired to be able to weld.

To this end, the invention relates to a pair of spot welding tongs comprising an articulation comprising two supports and two interchangeable arms, each carried by one of the supports and comprising a front part and rear part and two electrodes, each fixed to the front part of one of the arms.

According to the invention, one of the supports is a female support comprising two lateral flanks, each pierced by an orifice and the other support is a male support comprising a central flank pierced by an orifice, a pin traversing the orifices of the female support and the orifice of the male support so as to ensure the articulation of the male support with respect to the female support, said pin carrying two plates placed on either side of the male support and separating it from the female support, the supports being made from aluminum and treated by hard anodizing, and the plates facilitating the sliding of the supports relative to each other.

In a preferred embodiment, each support comprises a fork joint having two sides and a bottom, each of the two sides having an opening, each arm comprising an opening at its rear part and the latter being shaped so as to bear on the bottom of the fork joint of one of the supports and fixed on the latter by a pin traversing the openings of the sides of the fork joint and the opening in the rear part of the arm.

According to a preferred embodiment, said plates carried by the hinge pin of the supports are linings for dry sliding, advantageously comprising a metal support plate covered by a coating based on fluorocarbonated fibers.

BRIEF DESCRIPTION OF THE DRAWINGS

The invention will be described in detail with reference to the drawings, in which.

DESCRIPTION OF THE PREFERRED EMBODIMENTS

Figure 1:
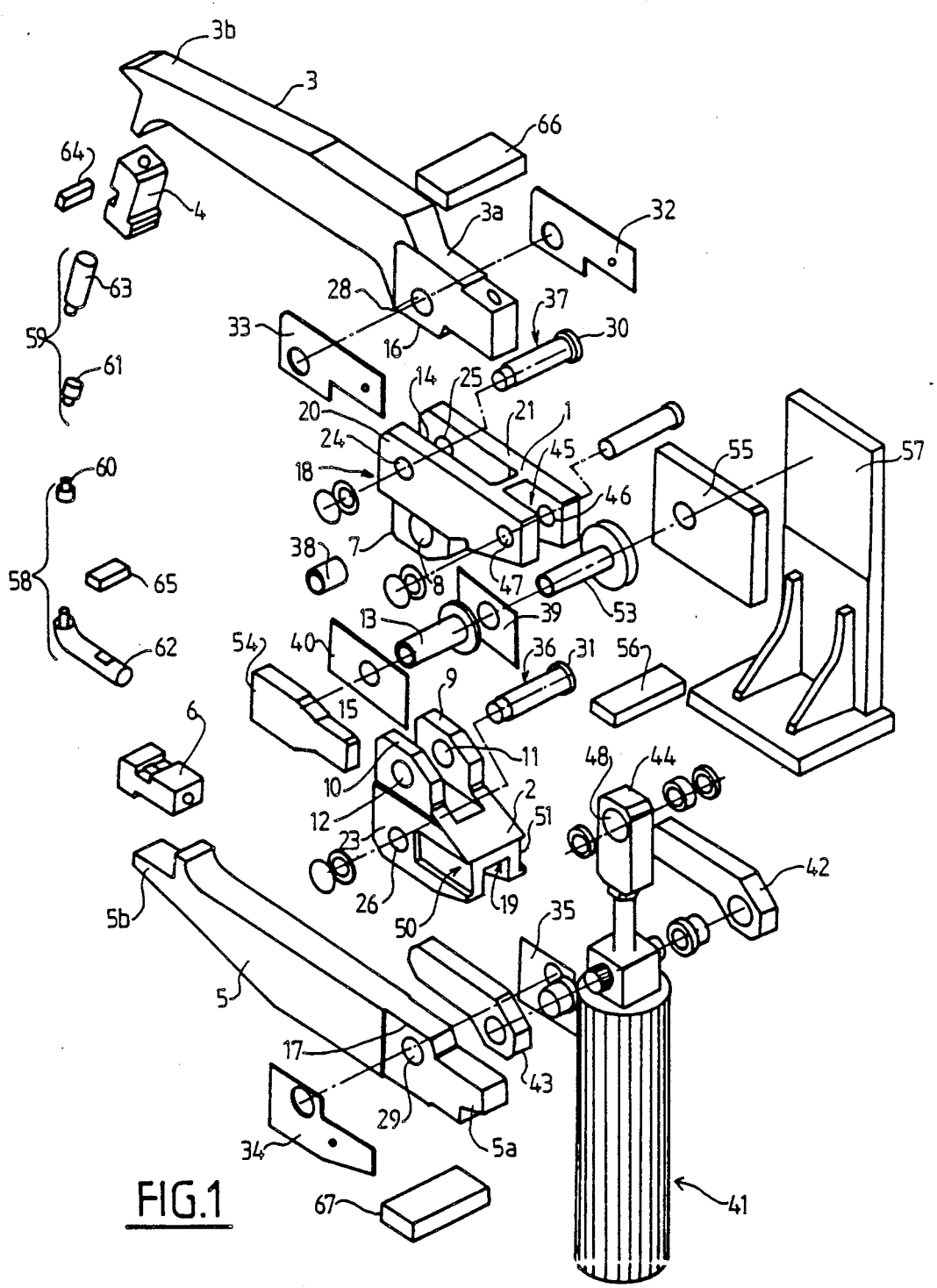
FIG. 1 is an exploded view of an embodiment of the pair of welding tongs of the invention.
Figure 2:
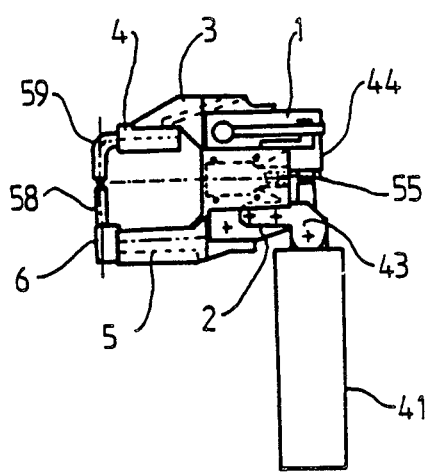
FIG. 2 is a side view of one of the embodiments of the pair of welding tongs according to the invention.
Figure 3:
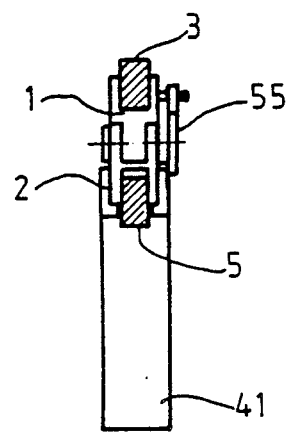
FIG. 3 is a rear view of the pair of welding tongs according to the invention.
Figure 4:
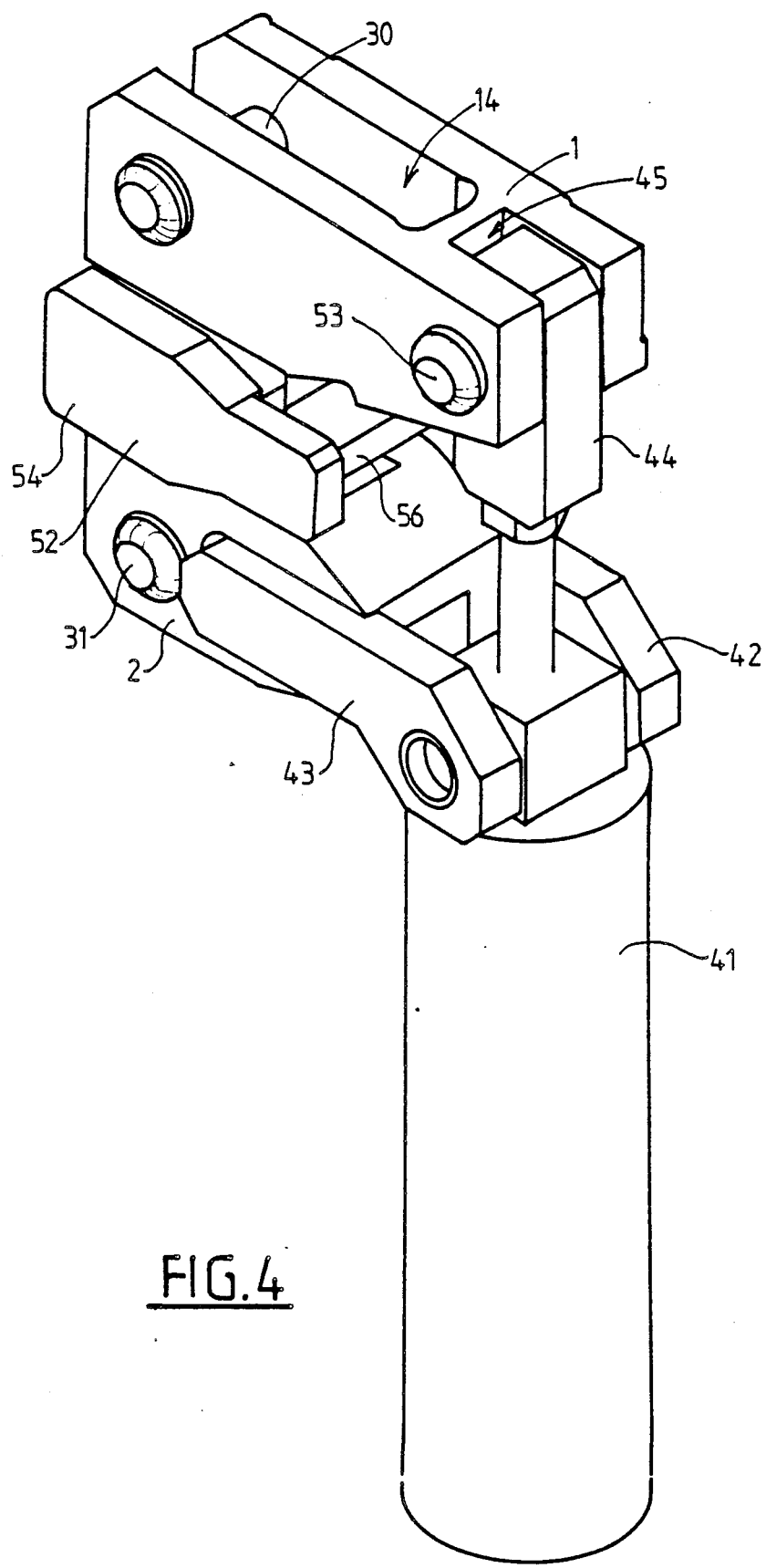
FIG. 4 is a perspective view of an embodiment of the articulation of the pair of tongs of the invention and of its control device.

The pair of welding tongs comprises a male support 1 and a female support 2 articulated with respect to each other. The support 1 carries the upper arm 3. This upper arm 3 is connected to the support 1 at its rear part 3a and carries at its front part 3b an electrode holder 4.

In a similar manner, the lower arm 5 is connected to the support 2 at its rear part 5a and carries at its front part 5b an electrode holder 6.

The male support 1 comprises a central flank 7 pierced by an opening 8.

The female support 2 comprises two lateral flanks 9, 10, each pierced by an opening 11, 12.

The central flank 7 of the male support 1 is engaged in the female support 2 between the lateral flanks 9 and 10.

A pin 13 traverses the female support and the male support through the openings 8, and 12 and ensures the articulation of the male support 1 with respect to the female support 2. This pin 13 will subsequently be referred to as the hinge pin.

Each of the supports 1, 2 comprises, on the opposite side from the hinge pin 13, a fork joint 14, 15 respectively intended to receive the rear parts of the arms 3a and 5a. These rear parts, and more particularly the faces 16 and 17 turned toward the hinge pin 13, are shaped so as to bear on the bottoms 18, 19 of the fork joint for which they are intended.

Furthermore, the sides 20 to 23 of the fork joints 14 and 15 are pierced by holes 24 to 27, and the rear parts of the arms comprise openings 28, 29 intended to interact with the holes 24 to 27 formed in the sides of the fork joints 14 and 15. The rear part 3a of the arm 3 is engaged in the fork joint 14. The pin 30 traversing this fork joint 14 and this arm 3 through their openings 24, 25, 28 ensures the fixing of the arm 3 on the support 1. With the face 16 of the rear part 3a bearing on the bottom 18 of the fork joint 14, the arm 3 is fixed rigidly on the support 1, being incapable of moving.

In a similar manner, the arm 5 is fixed on the support 2. Its rear part 5a is engaged in the fork joint 15. The pin 31 traverses the support 2 and the arm 5 through the openings 26, 27, 29. The face 17 bears on the bottom 19 of the fork joint 15.

The arms 3, 5 are electrically insulated from the supports, 1, 2. For this purpose, insulating plates 32 to 35 are placed on either side of the rear parts 3a, 5a of the arms 3, 5 inside the fork joints 14, 15. Furthermore, the pins 30, 31 are insulated from the arms 3, 5 and from the supports 1, 2 by insulating sleeves 36, 37.

It must be pointed out here that, since the arms 3, 5 are fixed with respect to the supports 1, 2, the insulating elements 32 to 37 are not subjected to any friction stress likely to cause them to become worn quickly.

According to a important feature of the invention, the supports 1 and 2 are made from aluminum and have been treated by hard anodizing. This treatment is known per se. It may be a sulfuric process or a sulfuric oxalic process. This treatment is carried out over a thickness lying between 40 and 150 microns. Processes of this type are known, for example, under the registered tradenames "SANFOR" and "DURKALU". When treated in this way, the supports 1 and 2 have a very good resistance to wear and they are insulated with respect to each other.

A collar 38 is fixed by force-fitting into the hole 8 of the male support 1. This collar is traversed by the hinge pin 13. On either side of the central flank 7 of the support 1, inside the housing formed by the lateral flanks 9, 10 of the support 2, there are placed plates 39, 40 facilitating the sliding of the supports 1 and 2 with respect to each other, and to be more precise these plates 39, 40 facilitate the sliding of the central flank 7 with respect to the lateral flanks 9 and 10.

These plates 39, 40 are preferably linings for dry sliding. They comprise a metal support plate which is covered with a coating based on fluorocarbonated fibers. Such plates are known, marketed under the name "PYDANE".

The collar 38 and the pin 13 are preferably made from treated steel.

Thus, and this constitutes a very important advantage of the invention, the friction connection constituted by the articulation about the pin 13 of the support 1 with respect to the support 2 comprises no wearing element, made from insulating material subjected to friction stresses. For this reason, this articulation can be used under difficult conditions and for a long period of time without there being any need to carry out a maintenance operation.

The connection of the arms 3, 5 on the articulation 1, 2 enables them to be changed or adapted. Thus, a same articulation 2 can receive different types of arms 3, 5 as a function of the use envisaged. These arms 3, 5 can be made from aluminum or from copper.

The pair of welding tongs is controlled by the mechanism referenced as a whole by 41. This mechanism 41 comprises two lugs 42, 43 and a head 44.

This head 44 is connected to the male support 1 by a fork joint 45 placed at the rear of the male support. The sides of this fork joint 45 are pierced by holes 46 and 47, and the head 44 is itself pierced by a hole 48. The head 44 is engaged in the fork joint 45, and a pin 49 ensures the connection, free in rotation, of the head 44, engaged in the fork joint 45, on the support 1.

The support 2 moreover comprises, at its rear part, two lateral slots 50, 51 in which the lugs 42, 43 are engaged. The support 2 is thus fixed without being able to rotate on the control 41.

A manual, pneumatic, electrical or hydraulic actuation enable the head 44 to be displaced relatively with respect to the lugs 42 and 43, which causes the support to rotate with respect to the support 2, and consequently the arms 3 and 5 to move relative to each other.

The operation of the pair of welding tongs is optimized when it can be positioned freely during the clamping of the parts to be welded. This self-centering is effected by the use of an apparatus suspending the pair of tongs whilst at the same time holding them free in rotation with respect to their hinge pin 13. In order to enable it to function, the pin 13 is hollow and is itself intended to receive a solid steel pin 53. This pin 53 connects two plates 54, 55 respectively, placed o either side of the female support 2 and connected also by the spacer 56. The plate 55 is fixed rigidly on the suspension 57 which is the fixed securing point of the pair of tongs.

It will be understood that in this way the hinge pin 13 can rotate with respect to the pin 53 and enables the whole of the pair of tongs to rotate about this pin 53.

The electrodes 58, 59 each consist of a tip 60, 61 and of an extension piece 62, 63. The shape of the extension pieces 62, 63 depends on the type of weld which is to be made using the pair of tongs. In the embodiment shown in FIG. 1, the lower extension piece 62 is bent, whereas the upper extension piece 63 is straight. The extension pieces 62, 63 are advantageously fixed onto the electrode holders 4, 6 by the clamps 64, 65. The electrical supply of the pair of tongs is obtained via the arms 3, 5 onto which are screwed the terminals 66, 67.

The arms 3, 5 preferably comprise channels intended to be connected to a device for circulating liquid ensuring the cooling of the pair of tongs.

The pair of spot welding tongs is generally supplied by a source of 5 to 8 volts traversed by currents lying between 8,000 and 15,000 amperes.

The torques applied between the arms generally lie between 800 and 3,000 mN.

The pair of spot welding tongs of the invention is, as we have seen, particularly strong and requires only a very small amount of maintenance and is, in addition, modular and a same articulation can receive arms of varying dimensions and characteristics. That is the same articulation can be used in a gun whatever its type is (manual, mechanical or robot gun). It can be used as well when a transformer has to be carried by the gun or when it is not carried. Of course, in order to cover all possible requirements, several dimensions of articulation may be necessary, but it is considered that three articulations make it possible to cover all requirements. The same articulation can be actuated by a manual, pneumatic, electrical or hydraulic mechanism.

We claim:

1. A spot welding tong comprising an articulation comprising two supports, and two interchangeable arms, said arms being carried by one of the supports and comprising a front part and a rear part, and two electrodes, said electrodes being fixed to the front part of one of the arms, wherein one of the supports is a female support comprising two lateral flanks which are pierced by an orifice, the other support is a male support comprising a central flank pierced by an orifice, a pin traversing the orifices of the female support and the orifice of the male support so as to ensure the articulation of the male support with respect to the female support, said pin carrying two plates placed on either side of the male support and separating it from the female support, the supports being made from aluminum and treated by hard anodizing and the plate facilitating the sliding of the supports relative to each other, each support comprising a fork joint having two sides and a bottom, the two sides having an opening, each arm comprising an opening at a rear part thereof and said rear part being shaped so as to bear on the bottom of the fork joint of one of the supports and fixed on said bottom by a pin traversing the openings in the sides of the fork joint and the opening in the rear part of the arm.

2. The spot welding tong as claimed in claim 1, which comprises a control mechanism interacting with the supports, maintaining the electrodes spaced apart when at rest and bringing them closer together when actuated.

3. The spot welding tong as claimed in claim 2, wherein the control mechanism is actuated pneumatically.

4. The spot welding tong as claimed in claim 2, wherein the control mechanism is actuated electrically.

5. The spot welding tong as claimed in claim 2, wherein the control mechanism is actuated hydraulically.

6. The spot welding tong as claimed in claim 1, wherein the arms are made from aluminum.

7. The spot welding tong as claimed in claim 1, wherein the arms are made from copper.

8. The spot welding tong as claimed in claim 1, wherein said plates are linings for dry sliding.

9. The spot welding tong as claimed in claim 8, wherein said plates comprise a metal support plate covered by a coating based on fluorocarbonated fibers.

10. The spot welding tong as claimed in claim 1, wherein the hinge pin of the supports comprises a collar, a hollow pin and a solid pin, these three elements being made from treated steel, permitting a self-centering of the pair of tongs by rotation about the pin.

11. The spot welding tong as claimed in claim 10, wherein a collar is fixed by force-fitting in the orifice of the male support.

12. A spot welding tong comprising an articulation comprising two supports, and two interchangeable arms, said arms being carried by one of the supports and comprising a front part, and a rear part and two electrodes, said electrodes being fixed to the front part of one of the arms, wherein one of the supports is a female support comprising two lateral flanks which are pierced by an orifice, the other support is a male support comprising a central flank pierced by an orifice, a pin traversing the orifices of the female support and the orifice of the male support so as to ensure the articulation of the male support with respect to the female support, said pin carrying two plates placed on either side of the male support and separating it from the female support, the supports being made from aluminum and treated by hard anodizing and the plates facilitating the sliding of the supports relative to each other, comprising electrode holders placed at the front of each arm between said arm and its electrode, each support comprising a fork joint having two sides and a bottom, the two sides having an opening, each arm comprises an opening at a rear part thereof and said rear part being shaped so as to bear on the bottom of the fork joint of one of the supports and fixed on said bottom by a pin traversing the openings in the sides of the fork joint and the opening in the rear part of the arm, comprising a control mechanism interacting with the supports, maintaining the electrodes spaced apart when at rest and bringing them closer together when actuated, said plates being linings for dry sliding, said plates comprising a metal support plate covered by a coating based on fluorocarbonated fibers, the hinge pin of the supports comprising a collar, a hollow pin and a solid pin, these three elements being made from treated steel, permitting a self-centering of the pair of tongs by rotation about the pin, the collar being fixed by force-fitting in the orifice of the male support.

* * * * *